Jan. 13, 1925.
E. P. GOSCH
1,522,514
PLANT THINNING MACHINE
Filed March 14, 1924
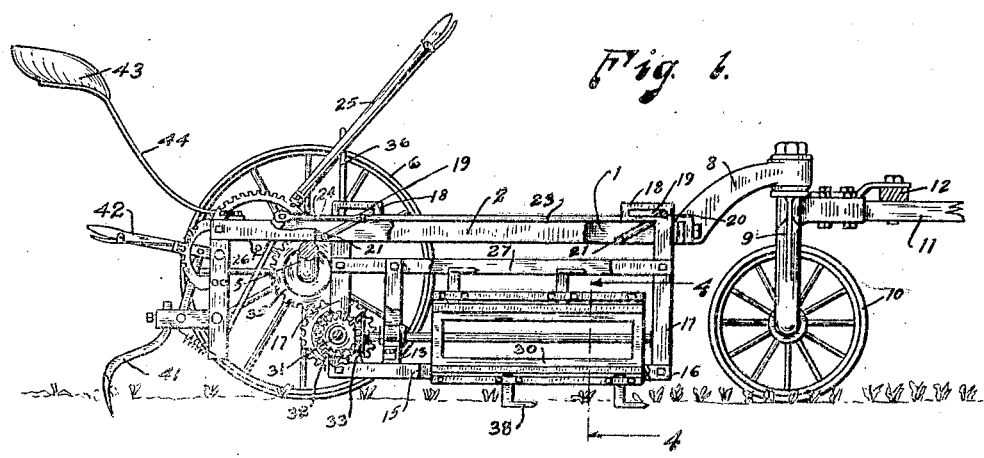
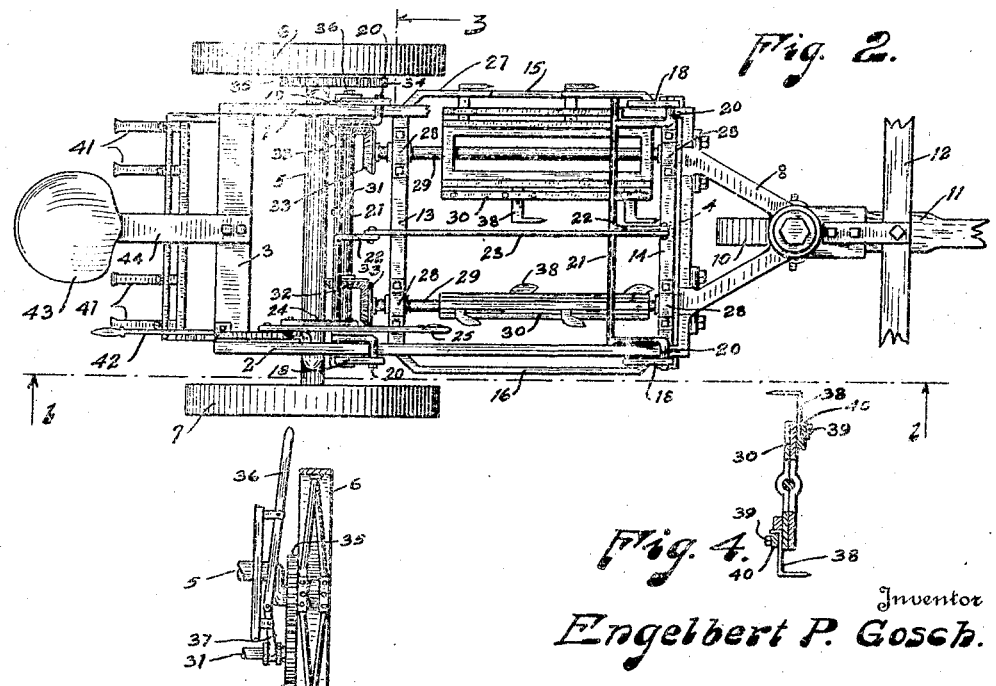
Inventor
Engelbert P. Gosch.
By A. J. O'Brien
Attorney Patented Jan. 13, 1925.

1,522,514

UNITED STATES PATENT OFFICE.

ENGELBERT P. GOSCH, OF LAFAYETTE, COLORADO.

PLANT-THINNING MACHINE.

Application filed March 14, 1924. Serial No. 699,250.

*To all whom it may concern:*

Be it known that I, ENGELBERT P. GOSCH, citizen of the United States, residing at Lafayette, county of Boulder, and State of Colorado, have invented certain new and useful Improvements in Plant-Thinning Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in machines for thinning sugar beets and other vegetables.

In the cultivation of sugar beets, and many other root crops as well, it is customary to sow the seeds in drills a few inches apart and to thin the beets some time after the seeds have grown sufficiently to make the rows clearly visible. The labor of thinning a large beet field is considerable.

It is the object of this invention to produce a device that can be drawn by horses or by a tractor and which will automatically cut out and thin the beets in the manner desired.

My machine, briefly described, consists of a device mounted on wheels and provided with two rotatable members spaced apart a distance equal to the distance between the rows. These rotatable members are provided with a plurality of hoes spaced apart along the sides thereof and are operatively connected to the drive wheels of the machine by means of gears that rotate the rollers at the speed required to produce the necessary thinning.

In order better and more clearly to describe my invention and the manner in which it operates, I shall have reference to the accompanying drawing in which the present preferred embodiment of my invention is shown, and in which:

Fig. 1 is a side elevation of my machine;

Fig. 2 is a top plan view thereof;

Fig. 3 is a section taken on line 3—3, Fig. 2; and

Fig. 4 is a section taken on line 4—4, Fig. 1.

A rectangular framework consisting of sides 1 and 2, a rear transverse member 3, and a front transverse member 4 is supported at its rear end on an axle 5 to the ends of which the wheels 6 and 7 are journaled. Secured to the transverse member 4 is a casting 8 which curves upwardly and has pivotally secured thereto a fork 9 to which the front or steering wheel 10 is rotatably mounted. A tongue 11 is secured to the fork and carries the equalizer 12 to the ends of which the horses are connected. A second frame consisting of end pieces 13 and 14 are secured to the rear and front ends respectively of the side members 15 and 16. At each corner of the second frame vertical members 17 are secured. The upper ends of these members have an angular piece 18 provided with a slot 19 for the reception of one of the crank pins 20 which are secured to the transverse rods 21. Crank arms 22 have their ends joined by means of a rod 23 so that the rods 21 will be forced to rotate in unison. A connecting rod 24 connects one of the crank arms 21 with the lever 25. As the latter is moved about its pivot 26, the second frame will be raised and lowered. The vertical corner members 17 are connected by bars 27. Rotatably mounted in bearings 28 are shafts 29 which carry rectangular rotating frame members 30. A shaft 31 is mounted at right angles to shafts 29 and carries gears 32 that mesh with cooperating gears 33 on shaft 29. Secured to one end of the shaft 31 is a gear 34 that is slidable but not rotatable with respect to the shaft. This gear is adapted to be moved into and out of cooperative engagement with the gear 35. Levers 36 and 37 or other equivalent means are provided for the purpose of moving the wheel 34. Hoes 38 are secured to the sides of the revolving members 30 by means of clamping bolts 39 and a bar 40. As the machine is moved in a forward direction, the frames 30 are rotated by means of the train of gears described above. This causes the hoes to describe helical paths through the air. The speed of rotation is so adjusted that the hoes 38 cuts the row at equally spaced intervals so as to remove all but those plants that are properly spaced. A cultivator, comprising teeth 41, follows the machine and moves dirt toward the plants. The depth at which the cultivator works may be regulated by means of the lever 42. A seat 43 supported on the end of the spring 44 serves to carry the operator. When the machine is to be transported, the gear 34 is moved out of mesh with gear 35 and the lower frame hoisted by means of the lever 25.

From the above it will be apparent that I have produced a machine that is well adapted to the thinning of beets, which is of substantial yet simple construction, and which can be cheaply manufactured and is easily operated.

Having now described my invention, what I claim as new is:

A machine for thinning sugar beets, comprising, in combination, a pair of drive wheels, a framework supported at one end by said wheels, a steering wheel secured to the framework near the front end thereof, a second framework underneath the first-mentioned framework, said second framework being substantially rectangular in shape and provided with vertical frame members at each corner, the upper ends of said vertical members having a horizontal elongated slot, two spaced rods pivotally attached to the first-mentioned framework, each rod having two crank arms, each adapted to engage one of said slots, a control lever, and means operatively related to the rods and to the control lever whereby when the lever is moved, the rods are rotated and the relative positions of the two frameworks altered.

In testimony whereof I affix my signature.

ENGELBERT P. GOSCH.